UNITED STATES PATENT OFFICE.

CHARLES CAMPBELL, OF NEW YORK, N. Y., ASSIGNOR TO HIMSELF AND JAMES H. DAVIDSON, OF SAME PLACE.

IMPROVEMENT IN PAINT COMPOUNDS.

Specification forming part of Letters Patent No. 141,544, dated August 5, 1873; application filed July 19, 1873.

*To all whom it may concern:*

Be it known that I, CHARLES CAMPBELL, of the city, county, and State of New York, have invented a new and Improved Paint Compound, of which the following is a specification:

This invention relates to a new composition for paint, whereby the paint is held perfectly in solution without settling, combining the pigment and oil, producing a glossy and consistent covering for the preservation of woodwork and other bodies, and effecting a considerable saving in the pigments employed. My invention consists of the solution of such ingredients in water with the pigment and oil that they mix well together and are held in solution, adding to its quality and adaptability.

The solution is prepared by dissolving six ounces of bicarbonate of soda and six ounces of borax in twelve gallons of water. Twelve gallons of this solution are then mixed with two hundred pounds of dry oxide of zinc, twenty-six gallons of linseed-oil, and six gallons of benzine, and thoroughly ground together, producing a glossy, cheap, and durable paint compound, which may be used as a base for any desired shade or tint by adding the necessary color to it.

Any other pigment may be compounded with the solution mentioned, the same binding the pigment and oil, so that a consistent paint is produced, which does not settle, and flows easily and evenly on the brush.

Having thus described my invention, I claim as new and desire to secure by Letters Patent—

A paint compound which is produced by combining the solution described with the pigment, oil, and benzine, in the proportions and manner as and for the purpose set forth.

CHARLES CAMPBELL.

Witnesses:
    PAUL GOEPEL,
    ALEX. F. ROBERTS.